(12) United States Patent
Schmidt et al.

(10) Patent No.: US 7,213,535 B2
(45) Date of Patent: May 8, 2007

(54) APPARATUS, SYSTEM AND METHOD FOR LITTER SIFTER

(76) Inventors: Ronald M. Schmidt, 221 S. Sparks St., Burbank, CA (US) 91506; Linda M. Schmidt, 221 S. Sparks St., Burbank, CA (US) 91506

( * ) Notice: Subject to any disclaimer, the term of this patent is extended or adjusted under 35 U.S.C. 154(b) by 0 days.

(21) Appl. No.: 11/510,005

(22) Filed: Aug. 24, 2006

(65) Prior Publication Data
US 2007/0012255 A1 Jan. 18, 2007

Related U.S. Application Data

(62) Division of application No. 10/953,315, filed on Sep. 28, 2004, now Pat. No. 7,114,459.

(51) Int. Cl.
*A01K 1/01* (2006.01)
(52) U.S. Cl. .................... 119/161; 119/166
(58) Field of Classification Search .......... 119/161, 119/165, 166, 167, 168; 209/233, 680; 210/464, 210/470, 499; 294/1.3, 1.4, 1.5
See application file for complete search history.

(56) References Cited

U.S. PATENT DOCUMENTS

| | | | |
|---|---|---|---|
| 2,284,342 A | 5/1942 | Quinby | |
| 2,496,077 A | 1/1950 | Wehner | |
| D199,320 S * | 10/1964 | Swett | D7/667 |
| 3,164,185 A * | 1/1965 | Ingoldt | 294/159 |
| 3,248,016 A | 4/1966 | Dahl et al. | |
| 3,666,096 A | 5/1972 | Riesbeck et al. | |
| D255,751 S | 7/1980 | Daenen | |
| 4,217,857 A | 8/1980 | Geddie | |
| D261,343 S * | 10/1981 | Gibiec | D7/667 |
| D289,095 S | 3/1987 | Chiodo et al. | |
| 4,972,800 A | 11/1990 | Bennett et al. | |
| D325,774 S | 4/1992 | Manville et al. | |
| 5,325,815 A | 7/1994 | Gumpesberger | |
| D351,489 S | 10/1994 | Helfrick | |
| D353,298 S | 12/1994 | Hartpence, Jr. et al. | |
| D362,572 S * | 9/1995 | Joseph, Jr. | D6/511 |
| 5,463,982 A | 11/1995 | Murphy | |
| D364,782 S * | 12/1995 | Kavanaugh | D7/682 |
| 5,503,110 A | 4/1996 | Miller | |
| 5,507,248 A | 4/1996 | Gabbert | |
| 5,515,812 A | 5/1996 | Faust | |
| D377,246 S | 1/1997 | Clenney | |
| 5,598,810 A | 2/1997 | Lawton, III | |
| 5,598,811 A | 2/1997 | Merchant | |
| D378,451 S | 3/1997 | Schmidt | |
| D378,724 S * | 4/1997 | Young et al. | D7/505 |
| 5,690,051 A | 11/1997 | Fisher et al. | |
| 5,699,754 A | 12/1997 | Cahajla | |
| 5,755,182 A | 5/1998 | Brown, Jr. et al. | |
| D398,088 S * | 9/1998 | Angier | D30/161 |
| D404,854 S | 1/1999 | Howarth | |

(Continued)

*Primary Examiner*—Yvonne R. Abbott
(74) *Attorney, Agent, or Firm*—Blakely Sokoloff Taylor & Zafman LLP

(57) ABSTRACT

A litter sifter and method for using. A litter sifter includes a lower portion having through-holes. An upper portion is connected to the lower portion. Handles are connected to the upper portion. The litter sifter having a flange. A distance between any two through-holes is equal to a distance between any other two through-holes.

12 Claims, 7 Drawing Sheets

U.S. PATENT DOCUMENTS

| | | | |
|---|---|---|---|
| 5,893,336 A * | 4/1999 | Vice et al. | 119/166 |
| RE36,554 E * | 2/2000 | Chedville | 118/13 |
| 6,079,364 A | 6/2000 | Tamba | |
| D435,759 S * | 1/2001 | Durbin et al. | D7/396.2 |
| 6,202,595 B1 | 3/2001 | Atcravi | |
| 6,367,409 B1 * | 4/2002 | Broom | 118/13 |
| 6,439,160 B1 | 8/2002 | Wheelwright | |
| 6,701,868 B1 | 3/2004 | Shepherd | |
| D488,890 S | 4/2004 | Radde | |
| 6,745,719 B1 | 6/2004 | Howerton | |
| 6,837,180 B2 | 1/2005 | Billi et al. | |
| D507,939 S | 8/2005 | Mitchell, Jr. | |
| D517,753 S | 3/2006 | Northrop | |
| 2004/0025797 A1 | 2/2004 | Sjogren | |
| 2005/0115510 A1 | 6/2005 | D'Anielo | |
| 2006/0060522 A1 | 3/2006 | Bushey | |

* cited by examiner

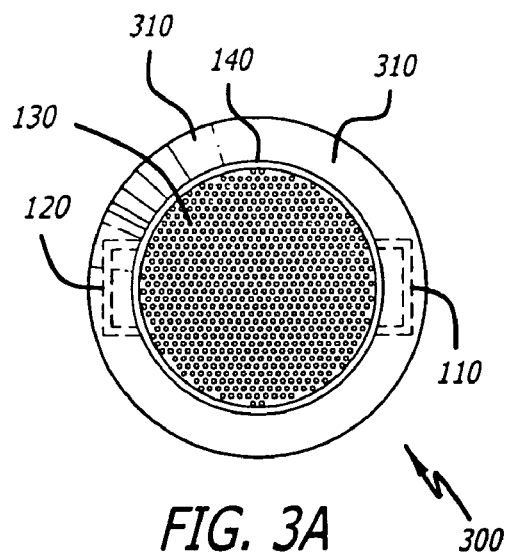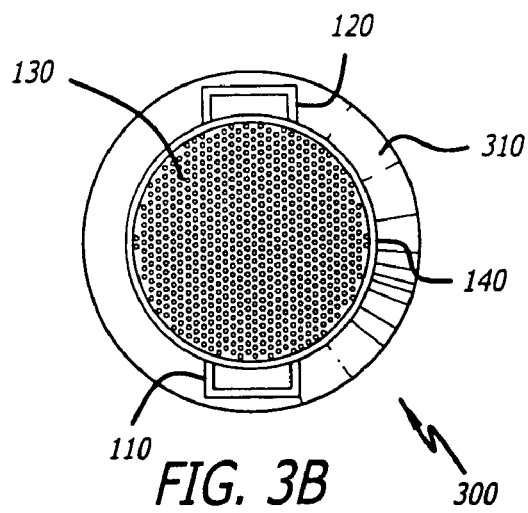
FIG. 3A  FIG. 3B
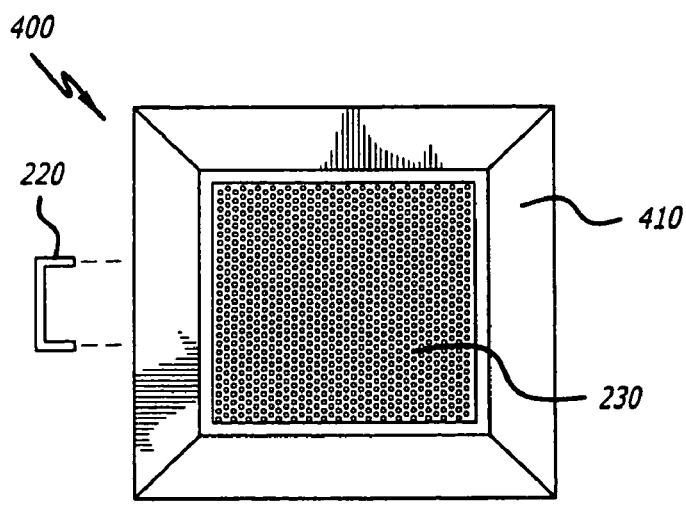
FIG. 4A
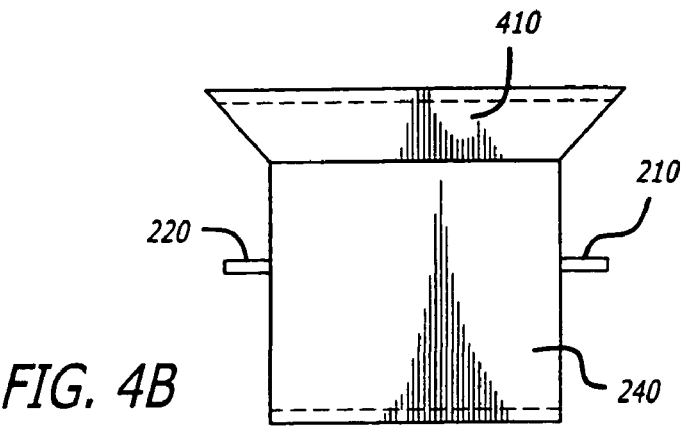
FIG. 4B

APPARATUS, SYSTEM AND METHOD FOR LITTER SIFTER

The application is a Divisional of U.S. patent application, Ser. No. 10/953,315, filed Sep. 28, 2004, now U.S. Pat. No. 7,114,459, entitled "APPARATUS, SYSTEM AND METHOD FOR LITTER SIFTER."

BACKGROUND

1. Field

This invention relates to litter sifters, and more particularly to litter sifters having through-hoes arranged to optimize removal of clumped litter and retention of clean litter.

2. Description of the Related Art

Litter boxes provide a relief station for cats and other small animals. The conventional litter box consists of a square, rectangular or round box having an open top end which is typically filled to a depth of two to three inches or more with granular material simulating fine gravel commonly referred to as "kitty litter." The kitty litter material is discarded and replaced as it becomes soiled. A "claimable" kitty litter material facilitates cleaning and reusing the litter material. When the "claimable" litter material becomes soiled with urine or feces, the moisture is absorbed and forms clumps of soiled material which can be removed by lifting them out. The lifting is carried typically carried out with a scooper or sifter. The scooper or sifter of the prior art, however, has openings or sifting openings that are too large and arranged to allow clumped material back into a litter box along with the unclumped material.

SUMMARY

A litter sifter includes a lower portion having many through-holes, an upper portion connected to the lower portion, and handles connected to the upper portion. The litter sifter having a flange. A distance between any two through-holes is equal to a distance between any other two through-holes.

A method for removing clumped litter material and sifting un-clumped litter material includes: providing a litter sifter. The litter sifter has a lower portion having many through-holes. A distance between any two through-holes is equal to a distance between any other two through-holes. An upper portion is connected to the lower portion. Handles are connected to the upper portion; the litter system having a flange; introducing a litter material into the litter sifter; gripping the handles; and sifting the introduced litter material so that solid matter and clumped litter material is retained in the litter sifter via the through-holes.

A litter box system including a litter box and a litter sifter removably connected with the litter box. The litter sifter includes: a lower portion having many through-holes, an upper portion connected to the lower portion, and handles connected to the upper portion. Any three adjacent through-holes of are arranged in an equilateral triangular pattern.

A method for removing clumped litter material and sifting un-clumped litter material includes: providing a litter sifter adaptable to be placed in an alternate container, the litter sifter having a lower portion having through-holes where any three adjacent through-holes are arranged such that any two adjacent through-holes have an equal distance from another two adjacent through-holes, an upper portion connected to the lower portion, and handles connected to the upper portion; dumping at least one container having litter material and solid material in said alternate container; and sifting the litter sifter so that solid matter and clumped litter material are retained in the litter sifter via the through-holes.

A litter box system including: a litter sifter removably connected with a sifter device disposed within an alternate container. The litter sifter including: a lower portion having many through-holes; an upper portion connected to the lower portion; and handles connected to the upper portion. A distance between any two through-holes is equal to a distance between any other two through-holes.

BRIEF DESCRIPTION OF THE DRAWINGS

The embodiments are illustrated by way of example and not by way of limitation in the figures of the accompanying drawings in which like references indicate similar elements. It should be noted that references in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments," are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

FIG. 3A illustrates a top and side plan view of the embodiment illustrated in FIG. 1 having flanges.

FIG. 3B illustrates a bottom and side perspective of the embodiment illustrated in FIG. 3A.

FIG. 4A illustrates a top view of the embodiment illustrated in FIG. 2 having flanges.

FIG. 4B illustrates a side view of the embodiment illustrated in FIG. 4A.

DETAILED DESCRIPTION

The invention generally relates to litter sifters using perforations (through-holes) that are arranged and sized to optimize removal of most, if not all, clumped litter and retention of clean litter (i.e., passed through the perforations). Referring to the figures, exemplary embodiments of the invention will now be described. The exemplary embodiments are provided to illustrate the invention and should not be construed as limiting the scope of the invention.

Figure 1:
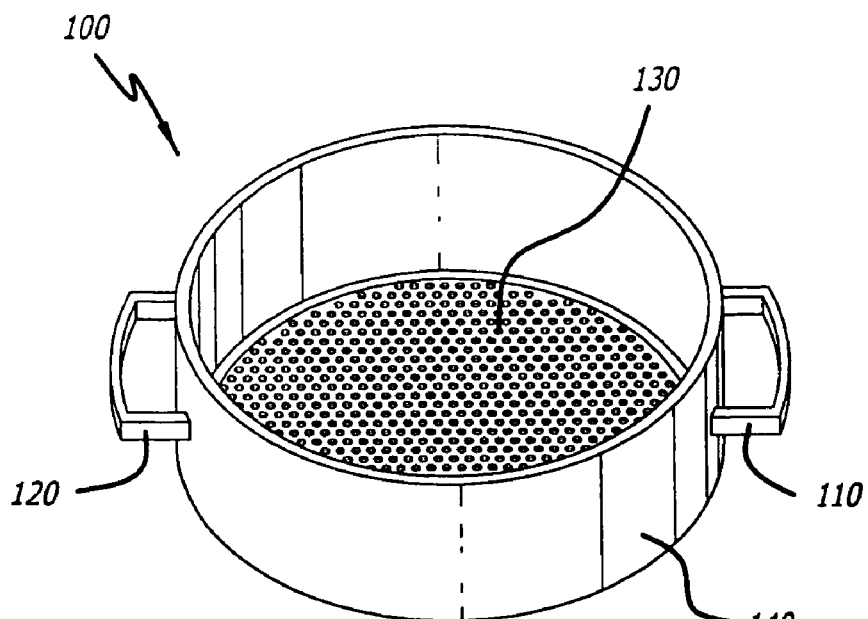
FIG. 1 illustrates an embodiment of a litter sifter.

FIG. 1 an embodiment of a litter sifter having circular shape. Litter sifter 100 includes lower portion 130 having a quantity of through-holes (perforations). In one embodiment the through-holes are circular shaped. It should be noted that the quantity of through-holes is dependent on the size of litter sifter 100. That is, the larger the litter sifter, the more through-holes in lower portion 130, and vice versa. Litter sifter 100 also includes upper portion 140 connected to lower portion 130. While litter sifter 100 is not primarily intended to be placed in a litter box, in case this use of litter sifter 100 is employed, in one embodiment upper portion 140 has a height so that animals (e.g., cats, rabbits, etc.) using a litter box, where litter sifter 100 is placed inside, can easily enter and leave. In the case where litter sifter 100 is used in a litter box, the non-retained litter material can pass through to an alternate container before being placed back into a litter box or container.

Litter sifter 100 includes handles 110 and 120 connected to upper portion 140 to allow for easy handling. In one embodiment handles 110 and 120 allow for placement and removal of litter sifter 100 from a container. In another embodiment, handles 110 and 120 allow for easy handling when contents of a litter box are dumped into litter sifter 100 for sifting of clumped contents. In another embodiment, handles 110 and 120 are removably connected to upper portion 140.

If litter sifter 100 is placed in a litter box, the embodiment illustrated in FIG. 1 should be placed in a circular shaped litter box. In another embodiment, an alternate container (see FIG. 8) is used to hold litter sifter 100. The alternate container has a top opening having a diameter to hold litter sifter 100 snugly. In this embodiment, litter sifter 100 lies within an upper portion of the alternate container and a litter box or container can have its contents dumped into litter sifter 100 when it is disposed in the alternate container. In this embodiment, multiple litter boxes can be emptied into litter sifter 100. The unclumped contents that pass through the through-holes of litter sifter 100 are accumulated in the alternate container. The alternate container can be used as a storage bin of the unclumped litter material for distribution at a later time to litter boxes. Litter sifter 100 can be sifted using back and forth, up and down, etc. motion to sift the unclumped litter material into an alternate container or a litter box (if sifter is sifted over the litter box).

Figure 5:
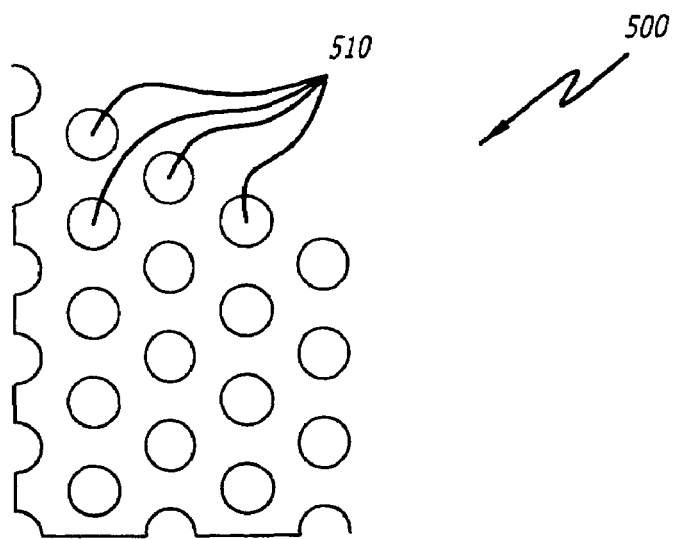
FIG. 5 illustrates a detailed view of web spacing for a bottom portion of the embodiments illustrated in FIGS. 1–4B.

In litter sifter 100, any two adjacent through-holes in lower portion 130 are arranged in an equidistant pattern (See FIG. 5). That is, any pair of through-holes have equal spacing as any other two adjacent through-holes. In one embodiment the distance between adjacent through-holes is ⅛ inch.

In one embodiment, the diameter of each through-hole is ¼ inch. The diameter of each through-hole optimizes the retention of clumped litter material and allows passing through of unclumped litter material. That is, if the diameter is larger (e.g., ⅜–½ inch) too much clumped material will pass through the through-hole; and if the diameter of the through-holes are much smaller (i.e., ⅛, 1/16 inch), it would be much harder to sift the unclumped material through the through-holes and a majority of the through-holes would get clogged with clumped material. It should be noted that this embodiment retains approximately 99% of the clumped litter material.

In one embodiment, the diameter of each through-hole and the distance between two adjacent through-holes have a proportion of two to one (2:1). In one embodiment, slightly larger or slightly smaller diameters of through-holes are used, the distance between the two adjacent through-holes maintains the proportion of 2:1 for these embodiments (e.g., 0.275/0.1375).

In one embodiment litter sifter 100 is made of either a metal, a metal alloy or plastic. In one embodiment, litter sifter 100 is made of 26–24 gauge sheet metal. In another embodiment the sheet metal is powder coated. In still another embodiment, litter sifter 100 is painted with a rust free paint to prevent a metal or metal alloy from rusting prematurely. In yet another embodiment where litter sifter is made of plastic, the plastic can be propropylene, polystyrene, acrylonitrile butadiene styrene (ABS), etc.

Figure 2:
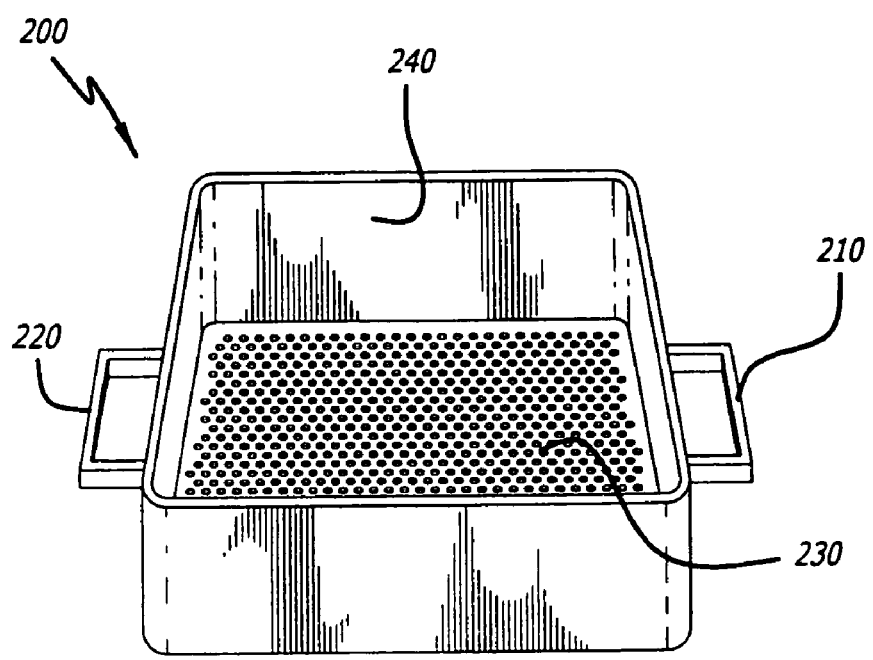
FIG. 2 illustrates another embodiment of a litter sifter.

FIG. 2 illustrates another embodiment of a litter sifter. Litter sifter 200 includes upper portion 240 that includes four walls. Any two adjacent walls of upper portion 240 are connected at a right angle and any two opposing walls are parallel to one another. Therefore, upper portion 240 can be shaped as a square (walls of equal length) or rectangle (parallel walls of equal length, opposing walls of equal length). Lower portion 230 is rectangular shaped. The embodiment of FIG. 2 contains similar features to the embodiment illustrated in FIG. 1, accept for the difference in shape. Therefore, if embodiments are placed in a litter box, the embodiment illustrated in FIG. 2 is placed in a rectangular shaped litter box.

Litter sifter 200 includes handles 210 and 220 connected to upper portion 240 to allow for easy handling. In one embodiment, handles 210 and 220 allow for easy handling when contents of a litter box are dumped into litter sifter 200 for sifting of clumped contents. In another embodiment, handles 210 and 220 a removably connected to upper portion 240 by using standard connectors, such as nuts/bolts, screws, etc. In another embodiment, handles 210 and 220 allow for placement and removal of litter sifter 200 from a litter box if used in such fashion.

In another embodiment, an alternate container (see FIG. 8) is used to hold litter sifter 200. The alternate container has a top opening having a length and width to hold litter sifter 200 snugly. In this embodiment, litter sifter 200 lies within the alternate container, and a litter box or container can have its contents dumped into litter sifter 200 that is disposed in the alternate container. In this embodiment, multiple litter boxes can be emptied into litter box sifter 200. The unclumped contents that pass through the through-holes of litter sifter 200 are accumulated in the alternate container. The alternate container can be used as a storage bin of the litter box material for distribution at a later time to litter boxes.

FIG. 3A illustrates a top and side plan view of an embodiment illustrated in FIG. 1 having a flange 310. FIG. 3B illustrates a bottom and side perspective view of an embodiment illustrated in FIG. 1. In one embodiment, handles 110 and 120 extend from upper portion 140 so that flange 310 extends outwardly to cover handles 110 and 120 from view when looking downward at litter sifter 300. In one embodiment, handles 110 and 120 have an extension of two inches from upper portion 140. In this embodiment, flange 310 extends outward to a furthermost distance of at least two inches. Flange 310 makes it easier to retain litter material and solid material emptied into litter sifter 300 by widening the opening.

FIG. 4A illustrates a top view of an embodiment illustrated in FIG. 2 having a flange 410. In one embodiment, handles 210 and 220 extend from upper portion 240 so that flange 410 extends outwardly to cover handles 210 and 220 from view when looking downward at litter sifter 400. In one embodiment, handles 210 and 220 have an extension of one and one half inches from upper portion 240. In this embodiment, flange 410 extends outward to a furthermost distance of at least one and a half inches. Flange 410 makes it easier to retain litter material and solid material emptied into litter sifter 400 by widening the opening.

FIG. 5 illustrates a detailed view of web spacing for a bottom portion of the embodiments illustrated in FIGS. 1–4B. As illustrated, a group of three through-holes 510 are arranged in a pattern such that any two adjacent through-holes have a distance that is equal to a distance between any other two adjacent through-holes.

Figure 6:
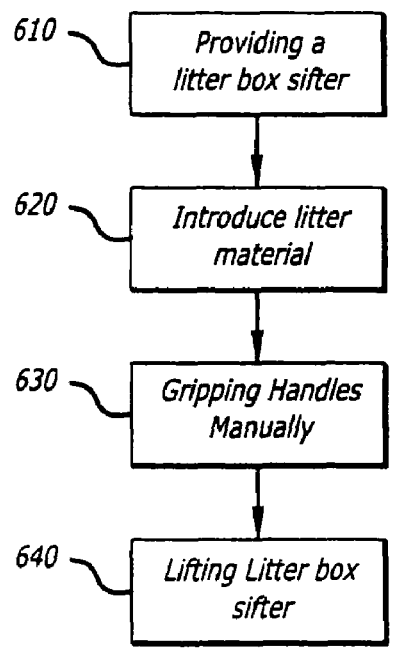
FIG. 6 illustrates a process for using embodiments of litter sifters.

FIG. 6 illustrates a process for removing clumped litter material and sifting un-clumped litter material. Process 600 begins with block 610. In block 610, a litter sifter is provided. The litter sifter provided includes a lower portion having through-holes, where any three adjacent through-holes are arranged in an equidistant pattern. The litter sifter provided also includes an upper portion connected to the lower portion. Handles are connected to the upper portion. Process 600 continues with block 620. In block 620 litter material is introduced into the litter sifter. Process 600 then continues with block 630 where the handles are gripped manually. Process 600 then continues with block 640 where the litter sifter is sifted so that solid matter and clumped litter material are retained in the litter sifter via the through-holes. In one embodiment, the litter sifter is lifted and shaken to sift the material introduced into the litter sifter.

In one embodiment where the litter sifter is used with a litter box, the litter sifter is lifted out of the litter box. After lifting the litter sifter (block 640) process 600 continues with disposing of solid and clumped material and placing remaining litter material located in the litter box in a temporary storage container. The litter sifter is then replaced back in the litter box and the litter sifter is then filled with additional litter material.

Figure 7:
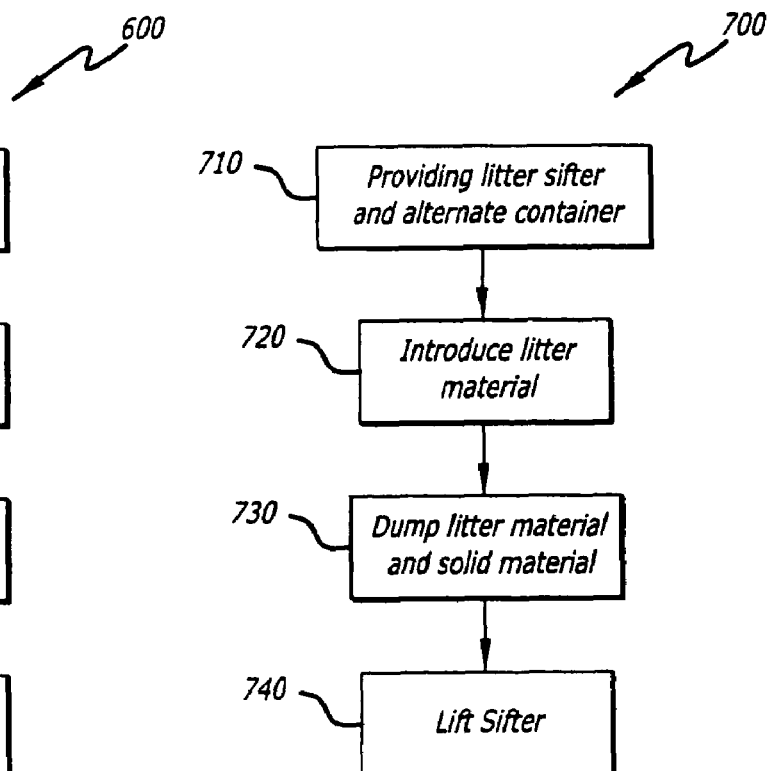
FIG. 7 illustrates another process for using embodiments of litter sifters.

FIG. 7 illustrates another process for removing clumped litter material and sifting un-clumped litter material. Process 700 begins with block 710 where a litter sifter adaptable to be placed in an alternate container and the alternate container are provided. The litter sifter provided has a lower portion with through-holes where any three adjacent through-holes are arranged such that any two adjacent through-holes have an equal distance from another two adjacent through-holes. The litter sifter has an upper portion connected to the lower portion and handles (connected to the upper portion). Process 700 continues with block 720 where litter material is introduced into the litter sifter that is inserted in the alternate container. Process 700 then continues with block 730 where at least one container having litter material and solid material is dumped in the litter sifter. Process 740 continues with block 740 where litter sifter is sifted so that solid matter and clumped litter material is retained in the litter sifter via the through-holes.

In one embodiment process 700 continues with disposing of solid and clumped material, placing the remaining litter material in a litter box, and replacing the litter sifter in the alternate container. In another embodiment, litter sifter is placed in a sifter device. In this embodiment, after block 730 is completed, the sifter device is activated and the litter sifter is either moved back in forth, vibrated, moved up and down, or any combination of movement to sift unclumped litter material through the through-holes.

Figure 8:
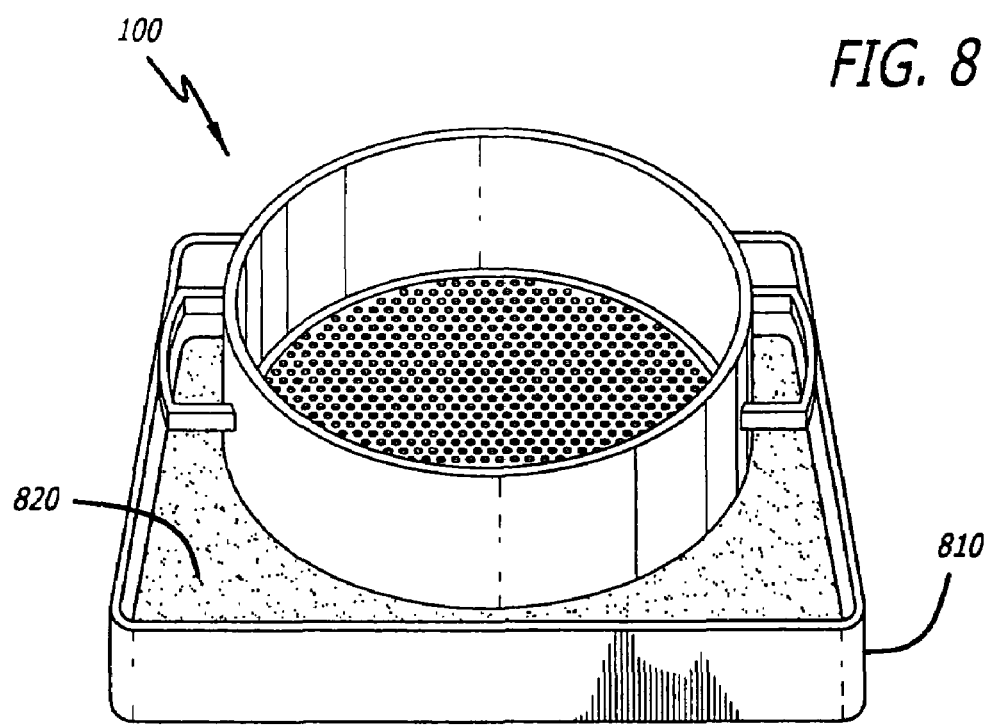
FIG. 8 illustrates an embodiment of a litter sifter disposed in an alternate container.

FIG. 8 illustrates an embodiment of a litter box system. Litter box system 800 includes a container (e.g., litter box) 810 and litter sifter 100 removably disposed with container 810. Container 810 is circular shaped and has a diameter slightly wider than litter sifter 100 so that litter sifter 100 does not have much movement when disposed in container 810. Handles 110 and 120 end up located above the top of container 810 when litter sifter 100 is disposed within container 810. Litter material 820 is added to litter sifter 100 to a desired amount.

Figure 9:
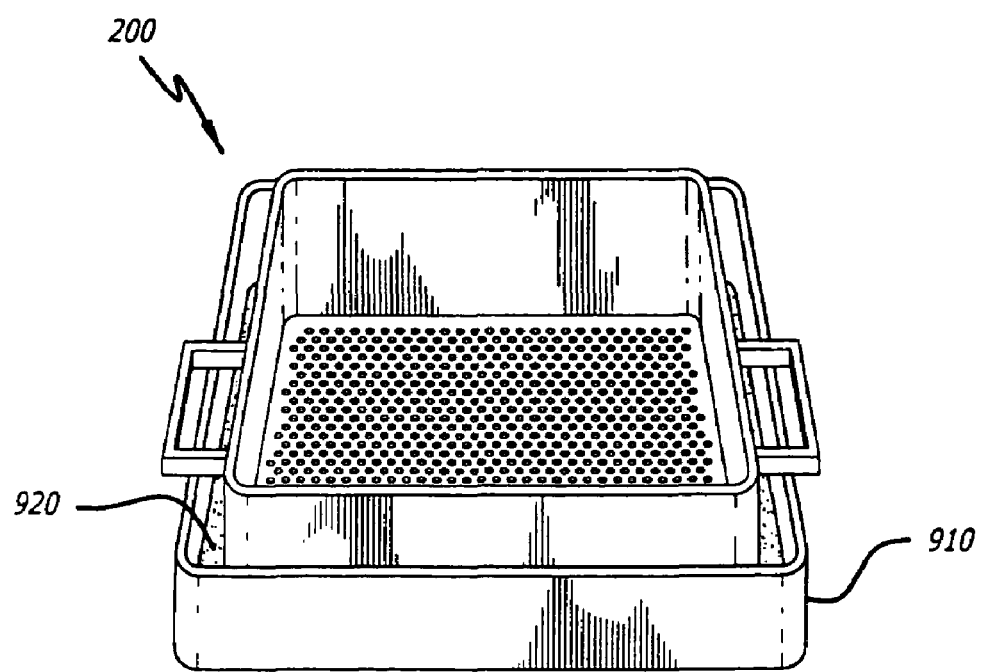
FIG. 9 illustrates another embodiment of a litter sifter disposed in another alternate container.

FIG. 9 illustrates another embodiment of a litter box system. Litter box system 900 includes a container (e.g., litter box) 910 and litter sifter 200 removably disposed with container 910. Container 910 is rectangular shaped and has a length and width slightly wider than litter sifter 200 so that litter sifter 200 does not have much movement when disposed in container 910. Handles 210 and 220 end up located above the top of container 910 when litter sifter 200 is disposed within container 910. Litter material 920 is added to litter box sifter 200 to a desired amount.

Figure 10A:
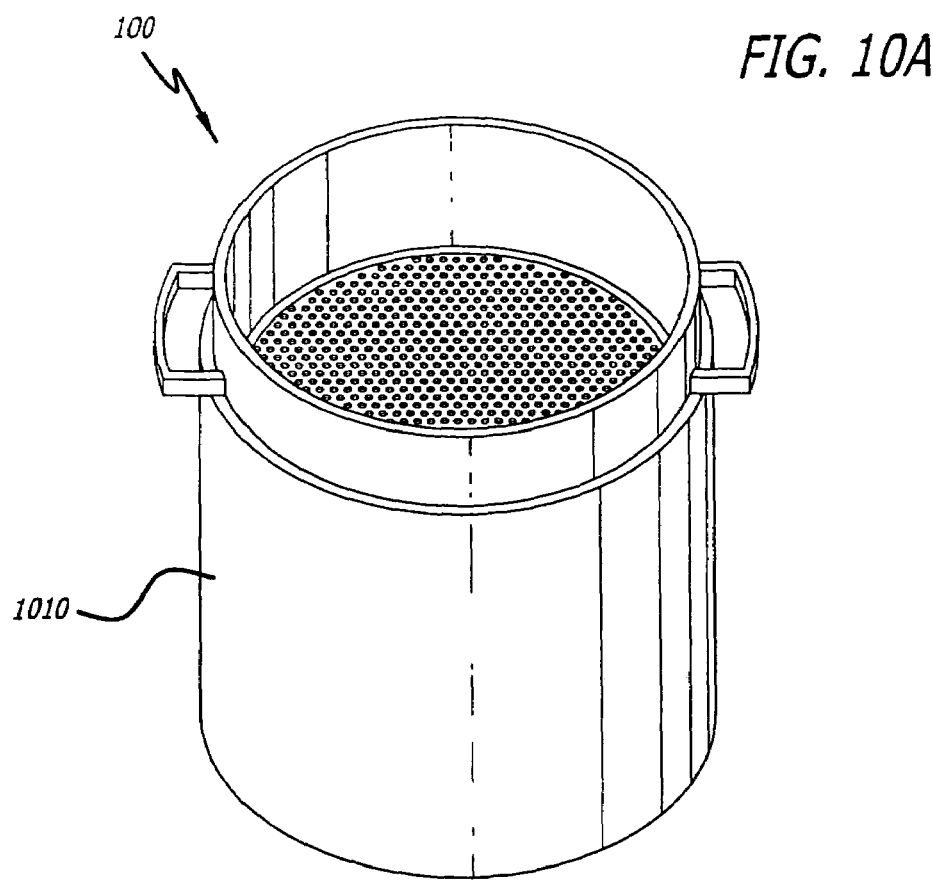
FIG. 10A illustrates a litter sifter as illustrated in FIG. 1 placed in an alternate container.

FIG. 10A illustrates the embodiment illustrated in FIG. 1 disposed in an alternate container 1010. Alternate container 1010 can be sized appropriately to need. For example, alternate container 1010 can be sized as a 5 gallon, 10 gallon, 40 gallon, etc. sized container (e.g., garbage can). Litter sifter 100 fits within alternate container 1010 so that it will not pass through more than its height (i.e., height of upper portion 140). Alternate container 1010 can be tapered or have stops that prevent litter sifter 100 from entering more than its height. After litter sifter 100 is disposed in alternate container 1010, litter can be sifted using litter sifter 100 for one or more litter boxes. The unclumped litter material passes through the through-holes and is collected in alternate container 1010. The clumped material and other solid material can be emptied into an appropriate container or collection device. In one embodiment, litter sifter 100 fits flush when disposed in alternate container 1010 and handles 110 and 120 rest on alternate container 1010, which prevents litter sifter 100 from being disposed further within alternate container 1010.

Figure 10B:
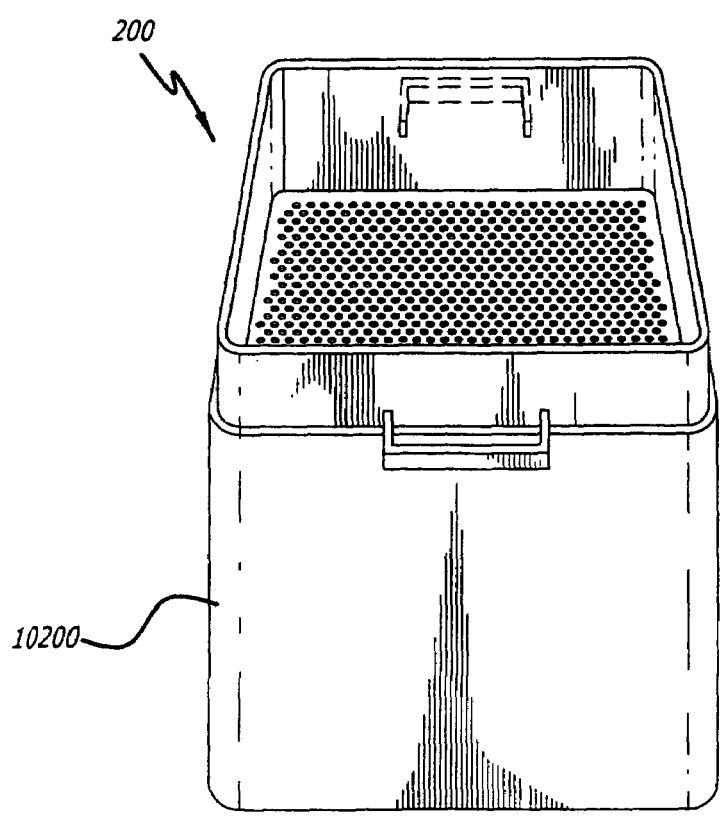
FIG. 10B illustrates a litter sifter as illustrated in FIG. 2 placed in an alternate container.

FIG. 10B illustrates the embodiment illustrated in FIG. 2 disposed in an alternate container 1020. Alternate container can be sized appropriately for a desired need. For example, alternate container 1020 can be sized as a 5 gallon, 10 gallon, 40 gallon, etc. sized container (e.g., garbage can). Litter sifter 200 fits within alternate container 1020 so that it will not pass through more than its height. Alternate container 1020 can be tapered or have stops that prevent litter sifter 200 from entering more than its height. After litter sifter 200 is disposed in alternate container 1020, litter can be sifted using litter sifter 200 for one or more litter boxes. The unclumped litter material passes through the through-holes and is collected in alternate container 1020. The clumped material and other solid material can be emptied into an appropriate container or collection device. In one embodiment, litter sifter 200 fits flush when disposed in alternate container 1020 and handles 210 and 220 rest on alternate container 1020, which prevents litter sifter 200 from being disposed further within alternate container 1020.

Figure 11:
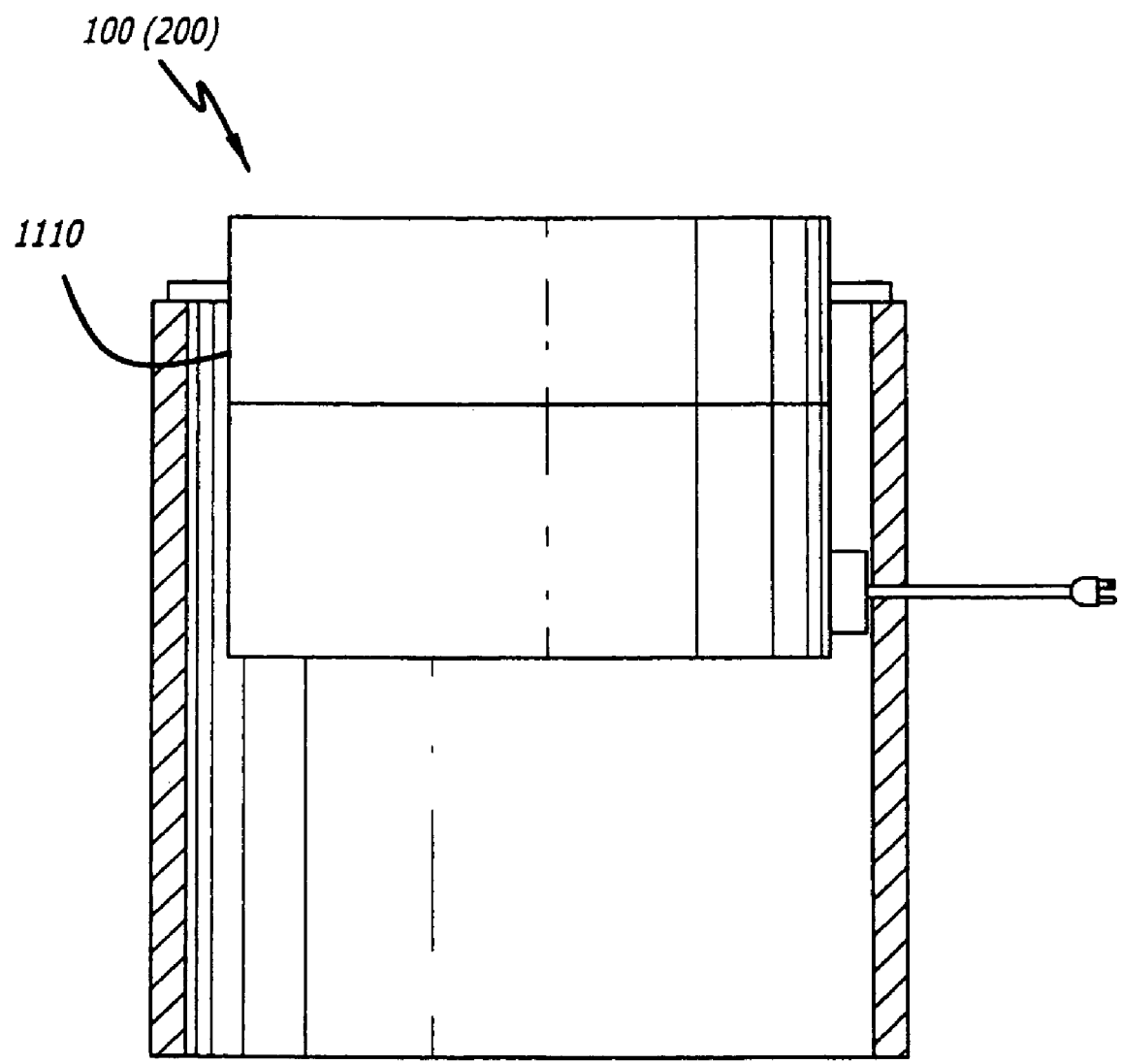
FIG. 11 illustrates an embodiment where a litter sifter is disposed within a sifter device.

FIG. 11 illustrates an embodiment where a litter sifter (100 or 200) is disposed within a sifter device 1100 that moves the litter sifter either side to side, up and down, vibrates, or any combination of movement. A litter sifter has dimensions to fit snugly within sifter device 1110 so the litter sifter will remain coupled when disposed within sifter device 1110. In one embodiment, litter box sifter has coupling brackets to secure itself within sifter device 1110 (e.g., clamps, butterfly nuts, etc.). Sifter device has a motor removably connected to a power supply (e.g., electric outlet) and a switch, connected to it to procure movement of the litter sifter. In one embodiment a timing circuit that has preselected movement periods is connected to the motor. This allows for set periods of on and than off for movement cycles. For example, if a thirty-second cycle is selected, the litter sifter will be moved (sifted) for thirty seconds when the switch is engaged and then automatically stop.

In one embodiment, sifter device 1110 works similarly to a paint shaker. In another embodiment, sifter device 1110 works similarly to an electric sander (vibration or side-to side high rpm). In another embodiment, at least one track is connected to sifter device 1110 to allow for up and down movement upon the track or side to side movement upon a horizontally connected track where the litter sifter has a guide connected to it to fit within the track. By having the sifter device coupled to the litter sifter, multiple litter boxes can be emptied in order to save time.

Figure 12:
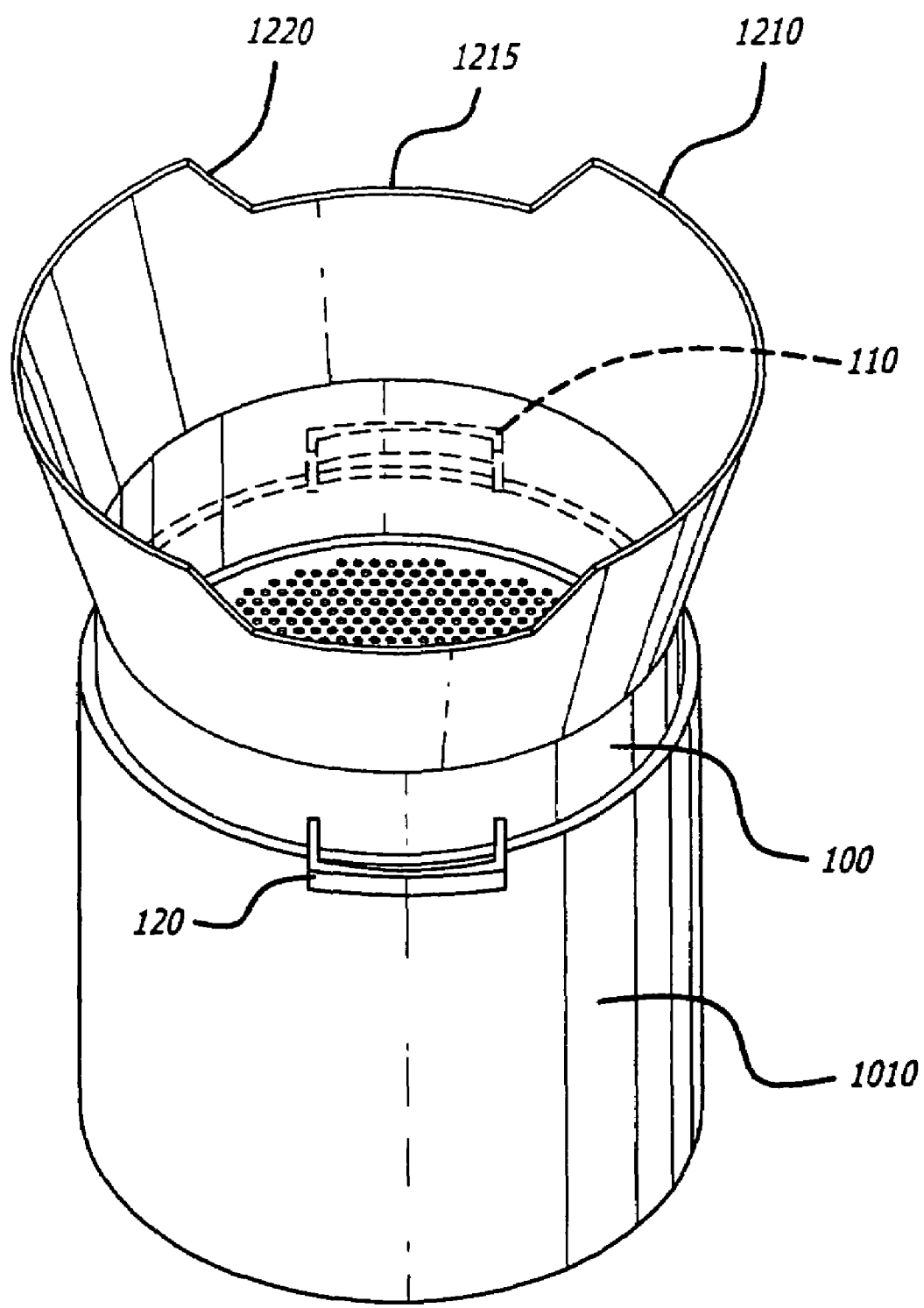
FIG. 12 illustrates an embodiment having a plurality of flanges.

FIG. 12 illustrates an embodiment having a flange to assist in keeping litter material within the litter sifter. Flange 1210 increases in radius from its base to its top. The top of flange 1210 has a larger radius than litter sifter 100 and allows for easier insertion of litter material to be sifted in litter sifter 100. Flange 1210 helps prevent litter material from missing (e.g., coming in contact with a floor) litter sifter 100 when inserted into litter sifter 100. In one embodiment, flange 1210 has first height 1215 and second height 1220. As illustrated height 1215 is lower than height 1220. In one embodiment the lower height of flange 1210 assists a user to be able to view and grip handles 110 and 120. In one embodiment flanges 1210 assist a user in resting a litter box on as lower height 1215 on two sides of flange 1210 form a holding area on flange 1210. In another embodiment flange 1210 allows stacking of a plurality of litter sifters 100 onto one another.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

The invention claimed is:

1. A litter sifter comprising:
a lower portion having a plurality of through-holes,
an upper portion coupled to the lower portion,
a plurality of handles coupled to said upper portion, and
a flange coupled to the litter sifter, wherein a distance between any through-hole for three closest adjacent through-holes is equal, a distance between adjacent through-holes is one half of a diameter of each through-hole of said plurality of through-holes, and each through-hole of said plurality of through-holes is circular.

2. The litter sifter of claim 1, wherein said flange has a first portion having a first height and a second portion having a second height, wherein the first height is less than the second height.

3. The litter sifter of claim 2, wherein the first portion assists a user to grip the plurality of handles.

4. The litter sifter of claim 1, wherein each of said plurality of through-holes has a diameter of ¼ inch.

5. The litter sifter of claim 4, wherein a distance between adjacent through-holes of said plurality of through-holes is ⅛ inch.

6. The litter sifter of claim 1, wherein said sifter is made of one of a metal, a metal alloy, and a plastic.

7. The litter sifter of claim 1, wherein said upper portion comprises four walls, wherein any two adjacent walls are coupled at a right angle and any two opposing walls are parallel to one another, and said lower portion is rectangular.

8. The litter sifter of claim 1, wherein said upper portion and said lower portion are circular.

9. The litter sifter of claim 1, wherein the diameter of a top of the flange is greater than a diameter of the litter sifter.

10. A method for removing clumped litter material and sifting un-clumped litter material comprising:
providing a litter sifter, said litter sifter having a lower portion having a plurality of circular through-holes, where a distance between any through-hole for three closest adjacent through-holes is equal, and the distance between adjacent through-holes is half of a diameter of each of the plurality of through-holes, an upper portion coupled to the lower portion, a plurality of handles coupled to said upper portion, and a flange coupled to the litter sifter,
introducing a litter material into said litter sifter,
gripping said plurality of handles, and
sifting said litter sifter so that solid matter and clumped litter material are retained in said litter sifter via said plurality of through-holes.

11. The method of claim 10, further comprising:
after sifting said litter sifter, disposing of said solid and clumped material, where remaining litter material is passed through the plurality of through-holes into a storage container, and
placing at least a portion of the remaining litter material in a litter box.

12. The method of claim 10, wherein the diameter of a top of the flange is greater than a diameter of the litter sifter.

* * * * *